UNITED STATES PATENT OFFICE.

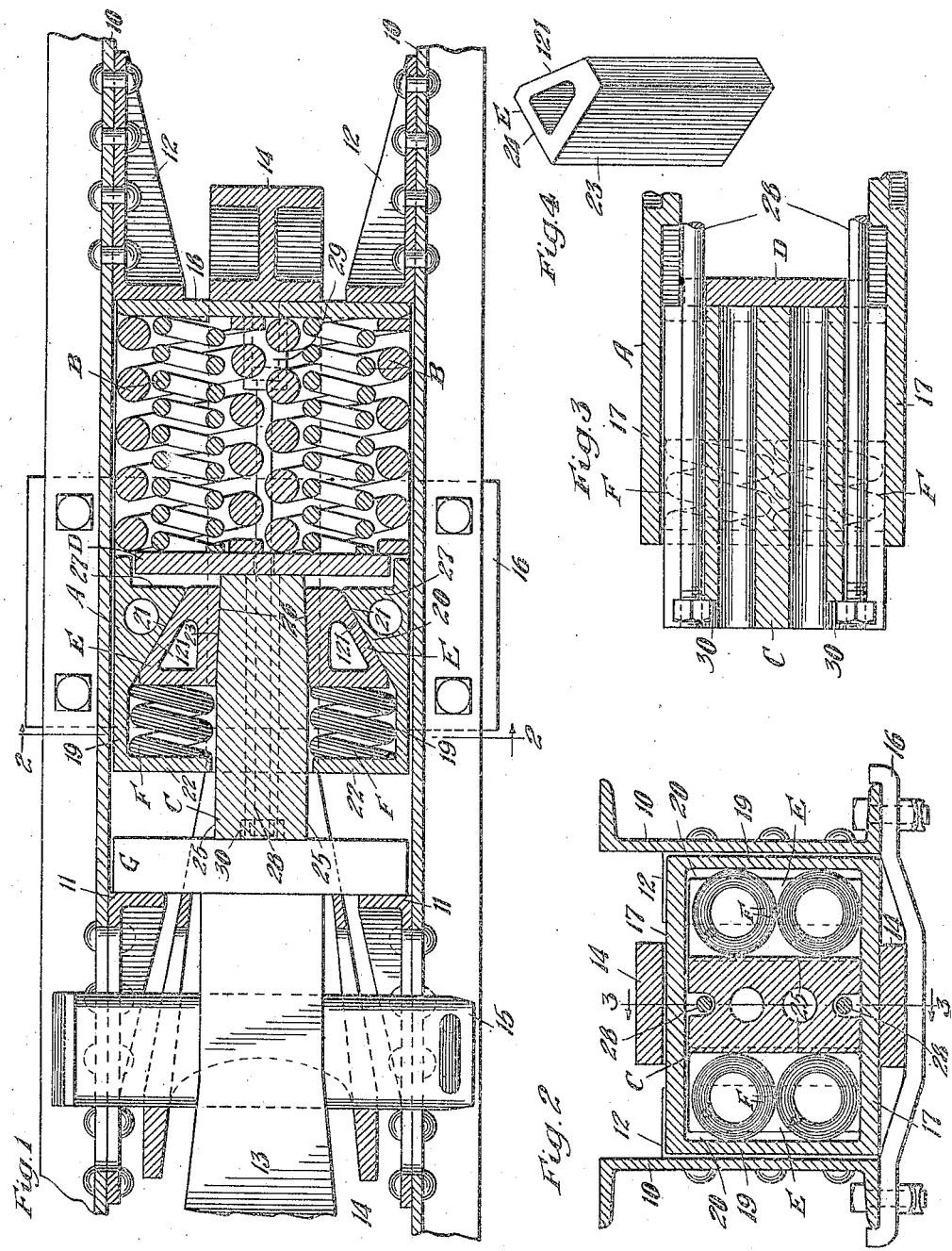

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,421,821.   Specification of Letters Patent.   Patented July 4, 1922.

Application filed June 13, 1921. Serial No. 476,987.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein are obtained high capacity, certain release and a smooth action.

More specifically, the object of the invention is to provide a friction shock absorbing mechanism of the plunger type wherein is obtained certain release in combination with means for automatically compensating for wear on the parts.

In the drawing forming a part of this specification, Fig. 1 is a horizontal longitudinal sectional view of a portion of a railway draft rigging showing my improvements in connection therewith. Fig. 2 is a vertical transverse sectional view corresponding substantially to the line 2—2 of Fig. 1. Fig. 3 is a broken longitudinal vertical sectional view corresponding substantially to the line 3—3 of Fig. 2 but illustrating the shock absorbing mechanism only and upon a somewhat larger scale. And Fig. 4 is a detail perspective of one of the wedge friction shoes.

In said drawing, 10—10 denote channel draft sills of a car underframe to the inner faces of which are secured front stop lugs 11 and rear stop lugs 12. A portion of a draw bar is indicated at 13 the same being operatively associated with the shock absorbing mechanism proper by hooded cast yoke 14 and coupler key 15. The yoke and parts therewithin are supported in operative position by a detachable saddle plate 16.

The improved shock absorbing mechanism proper, as shown, comprises, broadly, a casting A; twin arranged springs B—B; a friction plunger C; a spring follower D; a pair of combined wedge friction shoes E—E; and four additional springs F—F.

The casting A is of generally rectangular hollow box-like form having upper and lower walls 17—17 integrally united at their rear ends by a vertical wall 18, the latter functioning as the rear follower of the mechanism. In addition, said casting A is formed with relatively short side walls 19—19 so as to leave the major portion of the casting open on the sides to permit of the insertion and removal of the spring follower D and springs B—B.

At its forward end, the casting is provided on the inner sides of the walls 19 with preferably integral wedge sections 20—20 having wedge surfaces 21 on their inner opposed sides, said wedge surfaces converging inwardly of the mechanism. At its outer end the casting A is formed with inwardly extended transverse flanges 22—22, the same leaving a vertically elongated rectangular opening to accommodate the sliding movements of the plunger C.

Cooperable with each of the wedge surfaces 21 is a combined wedge friction shoe E. Each of the latter is formed on its outer side with a wedge surface 121 and on the inner side with a flat friction surface 23. At its outer end, each element E is formed with a transverse bearing face 24 against which bear the inner ends of two springs F, the latter being arranged in pairs on each side of the plunger C as best shown in Fig. 2. The opposite ends of the springs F bear against the inner sides of the flanges 22.

The plunger C is of generally rectangular cross-section as shown in Fig. 2 and is formed on the opposite sides thereof with friction surfaces which extend parallel as indicated at 25—25 and thence taper slightly inwardly as indicated at 26—26. The friction surfaces 23 of the wedge shoes E are inclined to correspond with the surface 26 of the plunger C. In normal position of the parts, the plunger C projects outwardly from the casting A a distance corresponding to the stroke of the mechanism and is engaged at its outer end by an ordinary front follower G. At its inner end the plunger projects inwardly of the inner ends of the wedge shoes E, a short distance as clearly indicated in Fig. 1 so that the spring follower D is normally separated a corresponding distance from the inner ends of the wedge shoes E and transverse shoulders 27 formed by the wedge sections 20.

The parts of the mechanism are held in assembled relation by any suitable means such as the two retainer bolts 28—28 which are anchored at their rear ends in suitable bosses 29—29 formed integrally with the rear wall 18 and, at their front ends, in suitable sockets 30—30 formed in the plunger C. As will be understood by those skilled in the art, the follower D and the plunger C are suitably recessed to accommodate the shanks of the bolts 28. The plunger C, wedge-shoes E and wedge-sections 20, may be cored as indicated in the drawing to minimize the amount of metal required and make the complete device as light as possible.

In actual practice, the parts will be so designed that the springs F will be placed under an initial compression and the same will also be true of the main spring resistance comprised of the springs B—B. Furthermore, the combined capacity of the springs B—B will very appreciably exceed the combined capacity of the four springs F—F in order to insure release as hereinafter described.

The operation of the mechanism is as follows, assuming an inward or buffing movement of the draw bar. As the latter moves inwardly, the plunger C is forced in the same direction simultaneously and uniformly therewith. Said plunger will be directly yieldingly resisted by the springs B—B re-acting through the spring follower D. In addition, due to the fact that springs F are under initial compression, the same constantly tend to expand and force the wedge-friction-shoes E along the wedge surfaces 21, thereby producing a frictional grip on the friction surfaces of the plunger C. As the latter moves inwardly, friction is generated between the plunger and the wedge-shoes E and, due to the slight taper on the plunger C, the wedge-shoes E will be slightly separated which may be compensated for partly by expansion of the casting A and partly by wedge-shoes E being forced backwardly along the wedge surfaces 21 against the action of the springs F. The limit of the compression stroke occurs when the follower G engages the outer end of the casting A.

Upon removal of the actuating force, the springs B immediately expand. Initially the friction between the wedge-shoes E and the plunger C in the release action may be great enough to prevent slippage of the plunger C with respect to the wedge-shoes E. However, on account of the excess capacity of the springs B as compared with the springs F, the former will have sufficient force to project the plunger and the wedge-shoes E as a unit outwardly until the gripping action of the wedge-shoes on the plunger is relieved and the plunger then projected back to its normal position without difficulty. As wear occurs on the friction surfaces 23 and 26, the wedge-shoes E will be slightly advanced as necessary inwardly of the wedge surfaces 21 under the expansion of the springs F which are always under compression. With my arrangement, I insure a certain release while at the same time being able to obtain a very high capacity in a friction gear employing a friction plunger. Heretofore, it has been found exceedingly difficult to employ a friction plunger with a sufficiently great gripping action to produce the desired capacity and at the same time obtain unfailing release. The parts of my mechanism may all be manufactured and assembled at comparatively small expense.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a container provided on the interior with opposed wedge surfaces; of wedge-friction-shoes cooperable with said surfaces; spring means reacting between said container and said wedge-shoes normally tending to impel the latter along said wedge surfaces; a friction plunger adapted to directly receive pressure at one end and frictionally slidable between said wedge-shoes; and a spring resistance cooperable with the opposite end of said plunger.

2. In a friction shock absorbing mechanism, the combination with a container provided on the interior thereof with a pair of oppositely disposed wedge surfaces converging inwardly of the container; of a pair of wedge-friction-shoes cooperable with said wedge surfaces; spring means reacting between one end of said container and said wedge-shoes normally tending to impel the latter along the wedge surfaces; a plunger having friction surfaces on opposite sides thereof cooperable with said wedge-friction shoes, said plunger being adapted to directly receive pressure at its outer end; and a spring resistance cooperable with the inner end of said plunger.

3. In a friction shock absorbing mechanism, the combination with a container provided on the interior with opposed wedge surfaces; of wedge-friction-shoes cooperable with said surfaces; spring means reacting between said container and said wedge-shoes normally tending to impel the latter along said wedge surfaces; a tapered friction plunger frictionally slidable between and cooperable with said wedge-shoes, said plunger being arranged to directly receive pressure at one end; and spring means yieldingly resisting movement of said plunger at its opposite end.

4. In a friction shock absorbing mechanism, the combination with a casting provided on the interior thereof with a pair of opposed wedge surfaces converging inwardly of the casting; of a pair of wedge friction shoes, each shoe having a wedge surface on the outer side thereof cooperable with one of said first named wedge surfaces and provided on its inner side with a friction surface extending at an acute angle with respect to the center line of the mechanism; springs re-acting between said wedge-shoes and the adjacent end of said casting; a plunger having friction surfaces on opposite sides thereof, the latter converging slightly and cooperable with said friction surfaces of the wedge-shoes; and a spring resistance reacting between the opposite end of said casting and the nearest end of said plunger.

5. In a friction shock absorbing mechanism, the combination with a container provided on the interior with opposed wedge surfaces; of wedge-friction-shoes cooperable with said surfaces; spring means reacting between said container and said wedge-shoes normally tending to impel the latter along said wedge surfaces; a friction plunger adapted to directly receive pressure at one end and frictionally slidable between said wedge-shoes; and a spring resistance cooperable with the opposite end of said plunger, said spring means and spring resistance both being under an initial compression and the spring resistance having a greater capacity than said spring means.

6. In a friction shock absorbing mechanism, the combination with a casting having a main spring cage and interior wedge surfaces converging inwardly toward the main spring cage; of main springs within said spring cage; wedge-friction-shoes cooperable with said wedge surfaces of the casting; secondary springs interposed between said wedge-shoes and the adjacent end of the casting and normally tending to impel the wedge-shoes toward the main springs; and a friction plunger slidable between and cooperable with said wedge-shoes, the outer end of said plunger extending beyond the adjacent end of the casting and adapted to receive actuating pressure, the inner end of the plunger extending inwardly beyond the wedge-shoes and yieldingly resisted by said main springs.

7. In a friction shock absorbing mechanism, the combination with a casting having a main spring cage and interior wedge surfaces converging inwardly toward the main spring cage; of main springs within said spring cage; wedge-friction-shoes cooperable with said wedge surfaces of the casting; secondary springs interposed between said wedge-shoes and the adjacent end of the casting and normally tending to impel the wedge-shoes toward the main springs; and a friction plunger slidable between and cooperable with said wedge-shoes, the outer end of said plunger extending beyond the adjacent end of the casting and adapted to receive actuating pressure, the inner end of the plunger extending inwardly beyond the wedge-shoes and yieldingly resisted by said main springs, the cooperating surfaces of the plunger and wedge-shoes converging at an acute angle inwardly toward the main springs.

In witness that I claim the foregoing I have hereunto subscribed my name this 9th day of June 1921.

JOHN F. O'CONNOR.

Witnesses:
CARRIE GAILING,
ANN BAKER.